Nov. 14, 1961  G. POTZL  3,009,116
BLOCKING OSCILLATOR
Filed May 8, 1959
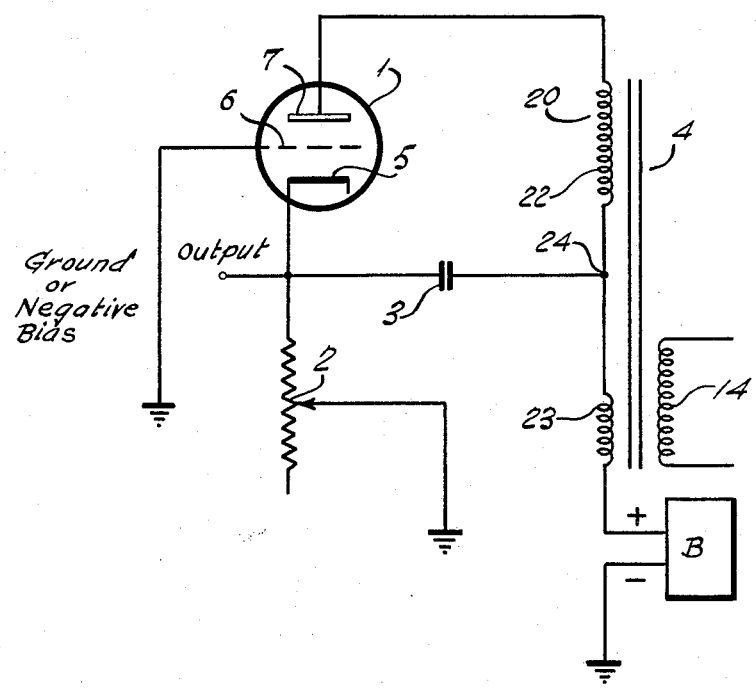
INVENTOR
GÜNTER POTZL

United States Patent Office 3,009,116
Patented Nov. 14, 1961

---

3,009,116
BLOCKING OSCILLATOR
Günter Pötzl, Plauen, Vogtland, Germany, assignor to VEB Blechblas und Signalinstrumentenfabrik Markneukirchen, Markneukirchen, Germany
Filed May 8, 1959, Ser. No. 811,865
Claims priority, application Germany May 14, 1958
8 Claims. (Cl. 331—149)

This invention relates to relaxation oscillators and in particular to blocking oscillators.

Time base or relaxation oscillations having sawtooth voltage or current waveforms are used in many applications in the electronic art. Examples of such applications are control voltages for horizontal and vertical deflections for the electron beam in television pick-up cameras and video receivers, for D.C. voltage variation and furthermore for high harmonic sound frequency voltages in electrical musical instuments.

The production of time base waveforms is accomplished in relaxation oscillators using gas discharge circuits, multivibrator arrangements and by means of self-blocking relaxation oscillators known as blocking oscillators. The function of the above time base oscillating generators or relaxation oscillators can be classified as well known.

Relaxation oscillator circuits using gas discharge tubes have the disadvantage of poor frequency stability. Multivibrators have better properties in this respect. However, they require use of a greater number of more expensive parts. The blocking oscillator is characterized by excellent frequency stability in the creation of time base voltages and by inexpensive materials and is, therefore, frequently used as a time base waveform generator or relaxation oscillator.

The commonly known basic principle used in the blocking oscillator is that in an oscillator arrangement coupled for regenerative feedback in an electron tube wherein the voltage variation of the anode is passed over a capacitor and a pulse transformer to a control grid to create a grid bias rise, D.C. grid current flows resulting in a negative charge on the capacitor on the side of the grid and a negative voltage on the grid. The anode current is then suddenly blocked and the cycle is cut off. A direct current passing through a resistor charges the capacitor slowly in accordance with the corresponding time constant of the RC combination. The anode resumes conduction when the grid voltage reaches a value greater than the cutoff voltage and the regeneratively coupled change in the anode voltage produces a new negative charge on the grid capacitor and the tube is again cut off. The frequency of the feedback coupled variation is determined by the resonant frequency of the winding of the pulse transformer. This is dimensioned so that a half wave of an oscillation is sufficient to permit the control grid potential to reach the required voltage for complete cut off of the anode current by means of the charging capacitor. The frequency of the entire cyclical variation is determined principally by the time constant of the RC combination of the grid condenser and the charging resistor. A sawtooth output can be taken off this resistor. It is also possible to take the output off a resistor connected to the anode winding of the pulse transformer. The added resistor on the anode winding of the pulse transformer serves as a current control. The addition of synchronizing pulses can then be achieved either over the grid or the plate.

This basic principle is used in all known blocking oscillators and even in their modifications. They all are characterized by the fact that the voltage on the control grid, which produces the sawtooth waveform on the anode, and is blocked by rectified grid current flow is a result of the tendency of feedback by the variations upon the grid by means of a capacitor.

The above basic principles have the following disadvantages:

(a) Relatively high synchronizing voltage requirements which are the result of limitation in feedback caused by tight coupling with the synchronized pulse which make themselves noticeable as feedback synchronization phenomena in frequency attenuation systems using relaxation oscillators and because of subharmonic static in the synchronizing pulse. This is only corrected by the known remedy of stronger synchronizing pulses.

(b) Small allowable load variations, because of frequency distortions caused by the loads.

(c) Output of relaxation oscillators taken off current limiting resistances produce frequency variations and undesirable waveforms.

(d) A great number and variation of capacitance values are necessary for the grid capacitor and the charging capacitor when blocking oscillators are used in synchronized frequency attenuating systems. These reactances must vary from stage to stage of the grid capacitor for alteration of the frequency of the waveforms of each dividing stage and the charging condenser in order to retain a constant amplitude and waveform from stage to stage despite the altered frequency of oscillations without feedback. As a result, an inconveniently large capacitance may be necessary for construction of frequency dividers especially at low frequencies.

It is an object of this invention to provide relaxation oscillators which provide uniform sawtooth output voltages which do not have the above-mentioned deficiencies.

It is a further object of the invention to provide a new principle for blocking oscillators whereby the problems above are solved and new advantages are added.

In accordance with the invention in a blocking oscillator having a triode tube with a cathode resistance, one other (A.C.) grounded electrode (plate or grid) and an auto-transformer connected to the last electrode, the signal in the auto-transformer is fed back to the cathode, which acts as a control electrode, by means of a charging capacitor which operates to block the build-up voltage after a certain time and cut off the cycle.

The various features of novelty which characterize the principle of the invention are pointed out with particularity in the claims annexed to and forming a part of the specification. For a better understanding of the invention, its operating advantages and specific objects attained by its use, reference should be had to the accompanying drawings and descriptive matter in which there are illustrated and described preferred embodiments of the invention.

The single figure is a schematic representation of a blocking oscillator circuit which embodies the principles of the invention.

The basic principle of the arrangement according to the invention is shown in the figure, wherein the oscillator includes a vacuum tube 1 having a cathode 5, a control grid 6 and an anode 7. The cathode 5 of electron tube 1 is connected through a load resistance 2, which may be variable, to ground potential, while the control grid 6 is applied directly to ground or may be applied to a source of negative bias. The anode 7 of the tube 1 is connected through the winding 20 of an oscillator transformer 4 to an anode voltage source B. The winding 20 is divided into two inductively linked series portions 22 and 23, connected at a tap 24, which need not be centered and may be positioned closer to the source. Between tap 24 of transformer 4 and the cathode 5 of tube 1 is a capacitor or condenser 3. Output may be taken from the cathode across load resistor 2 in any suitable manner.

The method of operation of the circuit according to the invention is as follows. When the operating voltage has been applied, the condenser 3 is charged through resistor 2 and the lower winding 23 of transformer 4. The charging time depends upon the time constant of the RC combination of resistance 2 and capacitor 3. The charging current of the capacitor, flowing through the resistance 2 decreases exponentially and produces a voltage drop which is positive with respect to ground. Since the control grid is connected to ground or a negative potential, the cathode potential of the tube 1, which is directly proportional to the voltage drop at resistance 2 and thus positive with respect to the ground potential, effects complete blocking of the anode current.

With increasing charge of the capacitor, the charging current flowing through the resistance 2 drops and the cathode potential of the tube 1, which is positive with regard to ground potential, falls to a correspondingly low value at which anode current begins to flow. At this moment, the circuit begins to work as grounded grid oscillator. The frequency of the oscillations produced depends upon the characteristic resonance of the total winding 20 of the transformer 4. Capacitor 3 which acts as a charging condenser for the tube 1 is connected parallel to the tube with respect to direct current and is spontaneously discharged, because the internal resistance of the non-conducting tube is small, due to the low cathode potential which is positive with respect to the ground potential. After the discharge of the capacitor, the anode current of the tube starts to flow through resistance 2. The cathode potential of the tube, which is positive with respect to ground potential, thus rises suddenly, and the anode current drops to a fraction of the previous value, as a result of the now high internal impedance of the tube, so that the capacitor can be charged again. The cathode potential which is positive with respect to ground then rises to a maximum value due to charging current flowing through the resistance 2. The tube, which is still excited, is blocked; no anode current flows and the oscillations produced in the grounded grid circuit stop. The cathode potential, which is positive with respect to ground, then drops exponentially again with increased charge of the capacitor by the current flowing through the resistor 2, and the above-described process is repeated.

Regulation of the sweep frequency is made possible by varying the cathode resistor 2. In addition, coupling of synchronizing pulses from an outside source, may be made by means of a third or auxiliary winding 14 on transformer 4. The pulses are impressed on the lower partial winding of the transformer, are increased, and fed to the cathode through the frequency determining capacitor.

The deficiencies of the previously known gate pulse circuits are obviated by the new and useful circuits shown in the figure in the following manner.

The control grid which is at ground potential is not affected by the produced waveform voltages. Therefore, an existing synchronizing voltage whose amplitude amounts to $1/200$ of the output waveforms is sufficient for synchronization.

The complete time-base voltage is across the relatively low load resistor 2, an advantage where there is a maximum value of resistance between the heater and the cathode of the electron tube as determined by the manufacturer. Because of its relatively small internal impedance the generator can endure higher loads without the frequency variation previously spoken of in the oscillation waveforms.

No variation is made in the frequency of the time base variation or waveforms when the resistance 2 remains constant.

By the use of the blocking oscillators in accordance with the figure in counters, the circuits of the various stages are only varied by one condenser whose capacitance is far less than used in common blocking oscillators.

Summarily, we have the following advantages:

The iron core for the pulse transformer can be made of a smaller dimension because the pulse transformer has a lower duty cycle. This is because with the same iron core and similar winding the inductance of the pulse transformer with respect to one with separate windings of like turn ratios is quadrupled as compared with the common blocking oscillator.

The resistor 2 in addition to its frequency function for the time base variation has the added function of limiting the value of the anode current. The capacitor 3 has, in addition to a frequency function for time waveforms, the function of a charge capacitor, which is not so in known blocking oscillators.

By means of a negative bias voltage on the control grid a lower discharge voltage of the capacitor 3 can be had. Its capacity can thereby be lowered for a particular frequency.

Similar connections are applicable to transistor circuits.

While particular embodiments of the invention have been shown and described in detail to illustrate the application of the invention principles, it will be understood that the invention may be embodied otherwise without departing from such principles.

What is claimed is:

1. A blocking oscillator comprising source means having a plurality of terminals each at a constant potential, a vacuum tube having a plurality of electrodes including an anode, transformer means having first and second windings arranged in series and connecting said anode to a first of said terminals, a grid connected to a second of said terminals having a potential which is negative with respect to the first terminal, and a cathode, load impedance means connecting said cathode to a third terminal having a potential which is negative with respect to the first of said terminals, a capacitor connected from said cathode to the junction of first and second windings so as to be charged through said impedance means by the difference in potential between said first and third terminals; said impedance means being of sufficient magnitude to raise the cathode potential so as to cut off conduction in said tube for a portion of the time during which capacitor charging current flows and to allow conduction upon decrease of charging current to a predetermined value, whereupon said capacitor tends to discharge through said tube, said transformer means regeneratively connecting said anode to said cathode through said capacitor to cause said tube to conduct and cut-off in a repetitive cycle.

2. A blocking oscillator comprising, a vacuum tube having a plurality of electrodes including, an anode, a cathode, a control grid, means connected to said grid to establish a first constant potential; a source of a second and third constant potential, said third potential being positive with respect to said second potential; impedance means connected from said cathode to said second potential; a pair of similarly wound inductively linked transformer windings in series connection with each other and having one end connected to said anode and the other end to said third potential; a storage capacitor connected between said cathode and the junction of said transformer windings to provide a regenerative path between said anode and cathode, said impedance means being of sufficient value to raise the cathode potential to a level above cut off for said tube during at least a portion of the capacitor charging current flow from said third potential through one winding of said transformer and through said impedance means.

3. A blocking oscillator circuit as set forth in claim 2, further including means applying a synchronizing signal for synchronization of regenerative operation in said tube.

4. A blocking oscillator as set forth in claim 3, including an auxiliary winding on said transformer adapted to receive incoming synchronizing signals for controlling regenerative operation in said tube.

5. In a blocking oscillator as set forth in claim 2, said impedance being a variable resistor.

6. The device of claim 2 wherein said grid and impedance means are connected to ground.

7. The device of claim 2, including output means connected to said cathode.

8. The device of claim 2 wherein said connection of said capacitor to said transformer junction is positioned closer to said other end and not centered.

References Cited in the file of this patent

UNITED STATES PATENTS

| | | |
|---|---|---|
| 2,535,285 | Heaton | Dec. 26, 1950 |
| 2,690,510 | Forbes | Sept. 28, 1954 |

FOREIGN PATENTS

| | | |
|---|---|---|
| 493,142 | Great Britain | Oct. 5, 1938 |